March 14, 1939. H. E. LAMBERT 2,150,174
APPARATUS FOR SECTIONING OF INKING ROLLERS
Filed Jan. 6, 1936 3 Sheets-Sheet 1
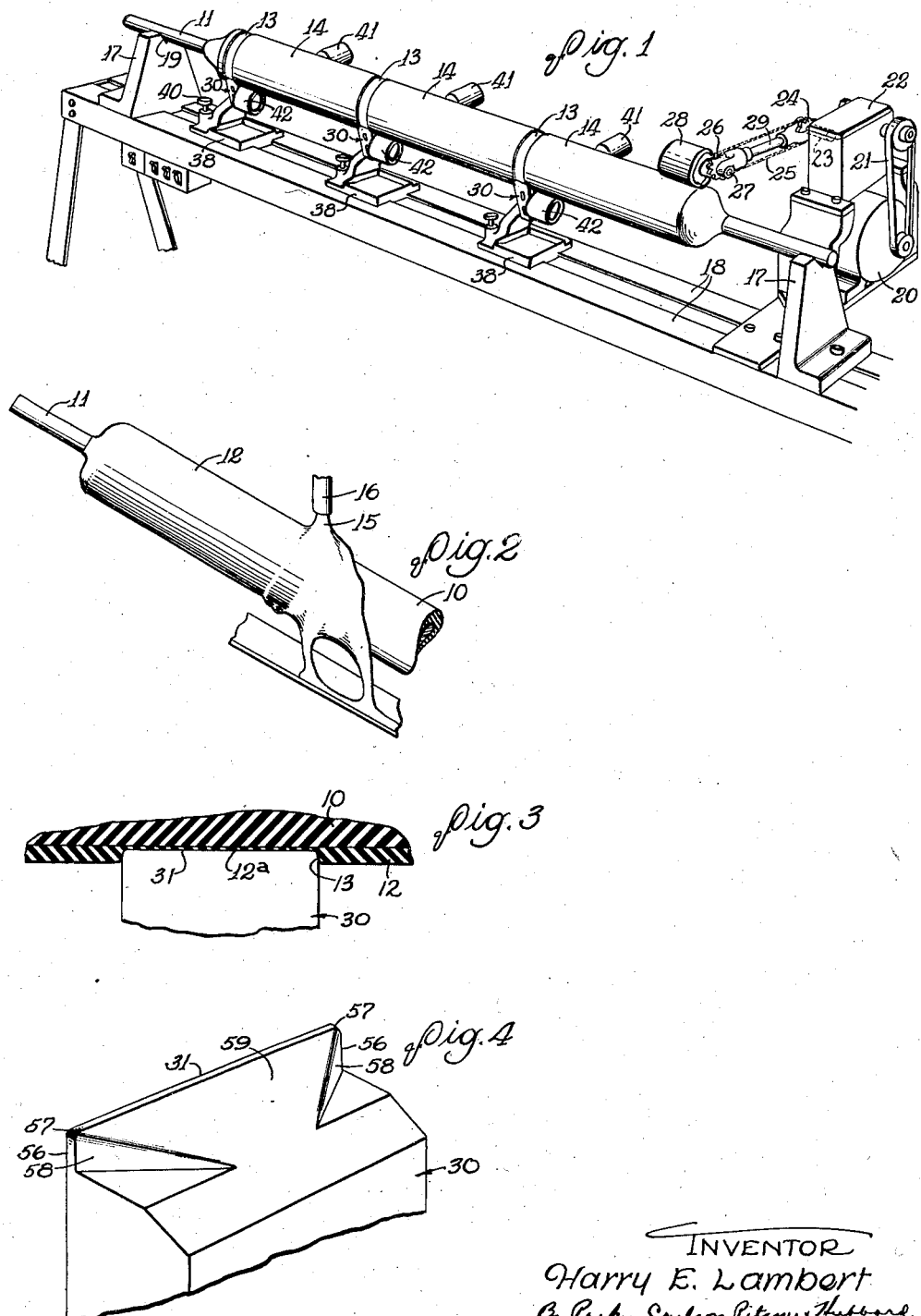

March 14, 1939.  H. E. LAMBERT  2,150,174
APPARATUS FOR SECTIONING OF INKING ROLLERS
Filed Jan. 6, 1936  3 Sheets-Sheet 2

INVENTOR
Harry E. Lambert
By Parker, Carlson, Pitzner-Hubbard
ATTORNEYS

March 14, 1939.   H. E. LAMBERT   2,150,174
APPARATUS FOR SECTIONING OF INKING ROLLERS
Filed Jan. 6, 1936   3 Sheets—Sheet 3
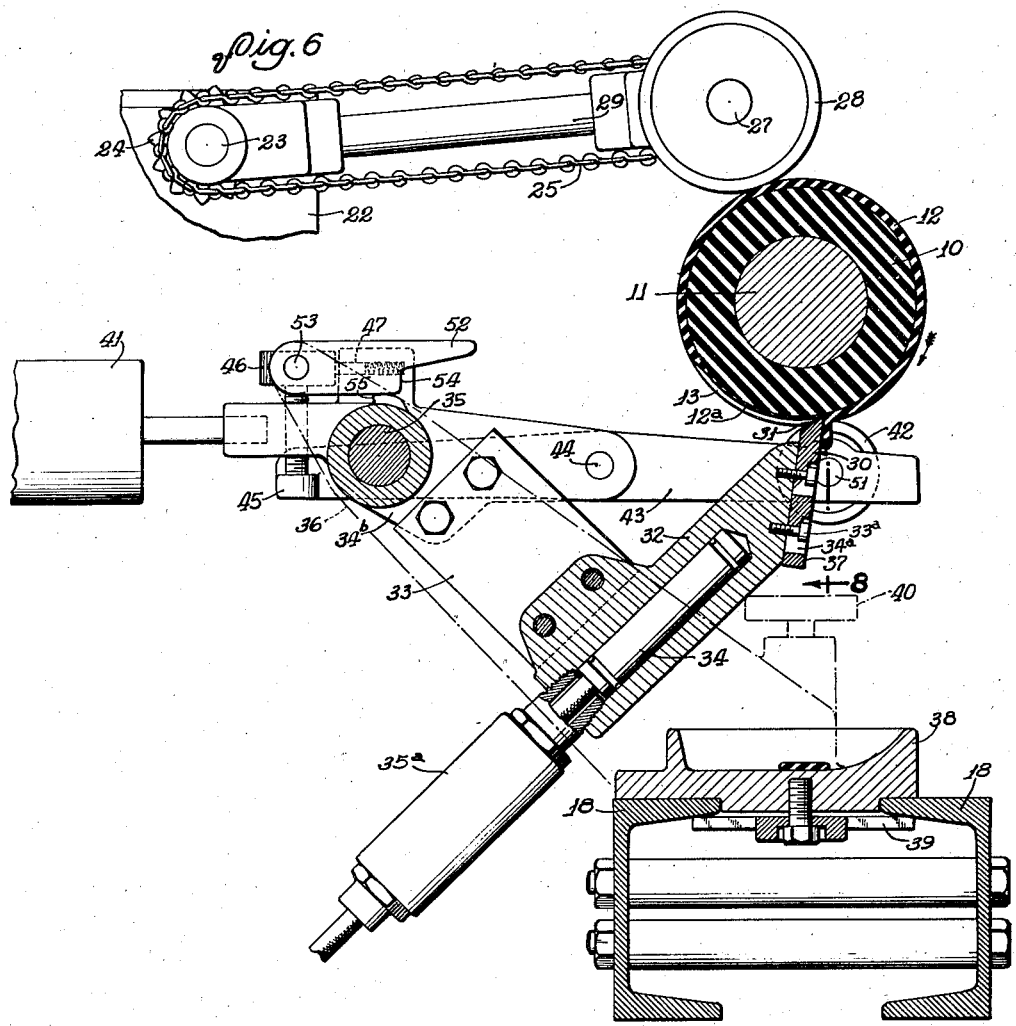
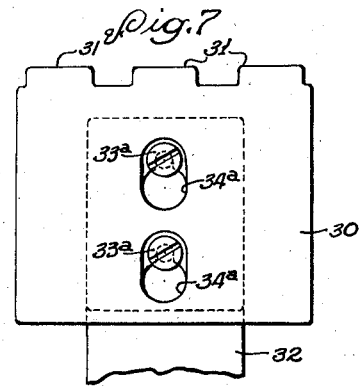
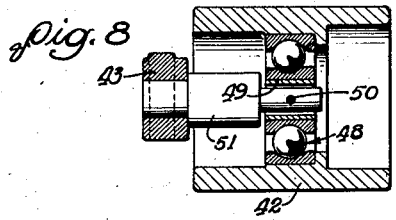
INVENTOR
Harry E. Lambert
By Parker, Carlson, Pitzner & Hubbard
ATTORNEYS Patented Mar. 14, 1939

2,150,174

UNITED STATES PATENT OFFICE 2,150,174

APPARATUS FOR SECTIONING OF INKING ROLLERS

Harry E. Lambert, Berwyn, Ill., assignor to Ideal Roller & Manufacturing Company, Chicago, Ill., a corporation of Illinois Application January 6, 1936, Serial No. 57,733

7 Claims. (Cl. 18—1)

This invention relates to the sectioning of inking rollers by melting and diverting off from the roller surface a band of material corresponding in cross sectional shape to the groove to be formed. More particularly the invention relates to the sectioning of rollers in which the inking surface is formed by a film of printers' composition or other molten material carried by a base cylinder composed of rubber or the like.

One object of the present invention is to provide a sectioning apparatus of the above character having a novel means for gauging the depth of the groove formed in the roller.

A further object is to provide an apparatus for sectioning coated rollers in a novel manner such as to leave a thin protective film of coating material covering the surface of the base roller at the root of the groove.

The invention also resides in novel features of the apparatus by which a roller may be sectioned accurately and conveniently regardless of the size of the roller.

Other objects and advantages of the invention will become apparent from the following detailed description taken in connection with the accompanying drawings, in which Figure 1 is a perspective view of a machine for sectioning rollers in accordance with the present invention.

Fig. 2 is a fragmentary elevational view illustrating a method of applying the composition coating.

Fig. 3 is a fragmentary sectional view of the coated roller and the sectioning tool.

Fig. 4 is a fragmentary perspective view of the sectioning tool.

Fig. 6 is a fragmentary vertical sectional view through the machine shown in Fig. 1.

Fig. 7 is a fragmentary elevational view of a modified form of sectional tool.

Fig. 8 is a section taken along the line 8—8 of Fig. 6.

Figure 5:
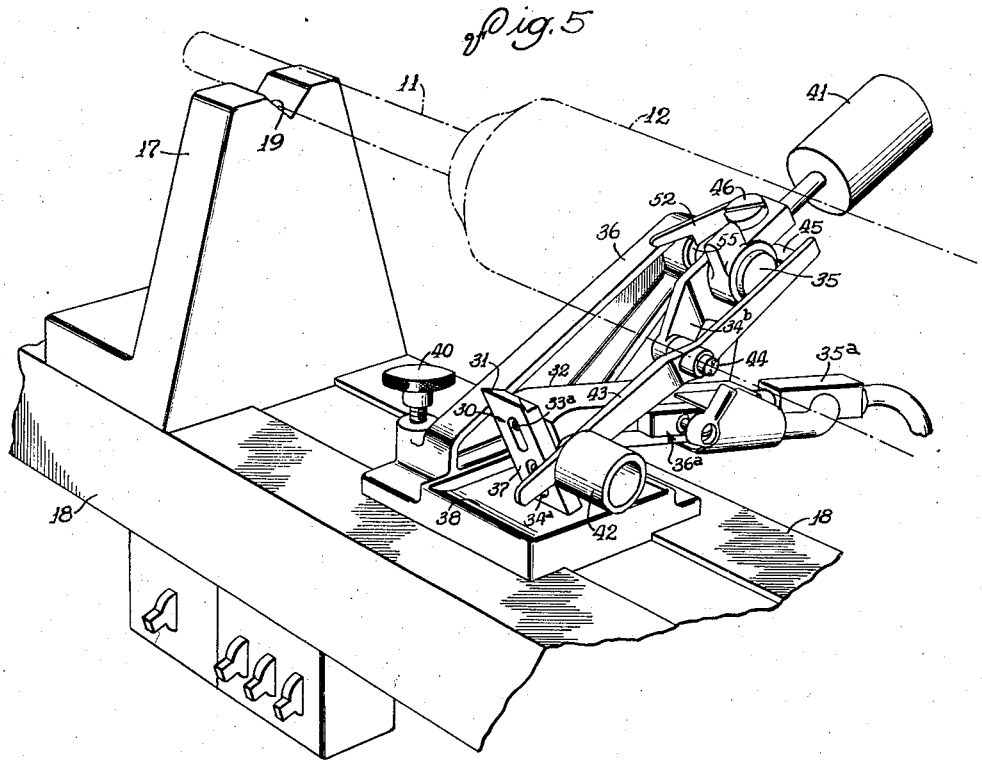
Fig. 5 is a fragmentary perspective view showing the sectioning tool and the manner in which it is supported.

While the invention is susceptible of various modifications and alternative constructions, I have shown in the drawings and will herein describe in detail the preferred embodiment, but it is to be understood that I do not thereby intend to limit the invention the the specific form disclosed, but intend to cover all modifications and alternative constructions falling within the spirit and scope of the invention as expressed in the appended claims.

Printers' composition, as generally employed for resurfacing inking rolls, comprises a mixture of glue, glycerine and water which has no definite melting point but will begin to soften at a temperature of about 125 degrees Fahrenheit and flow freely at somewhat higher temperatures, for example 150 degrees.

The roller shown in the drawings to illustrate the present invention comprises a base 10 of vulcanized rubber or like material fast on a metal stock 11 and a uniform coating 12 of printers' composition congealed on the cylindrical surface of said base and formed at one or more longitudinally spaced points with narrow annular grooves 13 dividing the peripheral surface of the roll into longitudinally spaced sections 14 on which inks of different colors may be carried during printing. The thickness of the coating may be varied as desired and usually ranges from .025 to .040 of an inch. The number of grooves is determined by the number of different colors of ink to be used. In the present instance, the grooves are of a depth substantially equal to the thickness of the coating 12, there being a continuous film 12ᵃ of composition a few thousandths of an inch in thickness at the bottom of the groove so as to form a covering for protecting the rubber base 10 against the action of the oils and solvents in the inks which tend to cause swelling and deterioration of rubber.

To form the roller above described, the invention contemplates first the formation of a congealed composition coating of uniform thickness over the entire surface of the base 10 and then removal of annular bands of the composition from the areas to be grooved by heating accurately localized areas of the coating to a temperature at which the composition will flow freely, the molten composition to a depth within a few thousandths of an inch of the rubber surface being diverted off leaving a very thin film at the bottom of the grooves.

A composition coating of the desired uniformity in thickness may be formed on the base roller by rotating the roller with its axis inclined to the horizontal and discharging onto the roller surface a stream 15 of molten composition maintained at a uniform temperature of about 160 degrees flowing from a nozzle 16 at a uniform rate in excess of that required to produce a coating of the desired thickness and moved at a uniform rate throughout the length of the roller beginning at the upper end thereof. The excess of molten composition thus applied drains along and from the roller as shown in Fig. 2, leaving a coating or film of uniform thickness upon congealing. With this method, a high degree of uniformity in the coatings on different rollers may be obtained.

Preparatory to removal of the bands of composition to form the grooves 13, the roller is rotatably supported in horizontal position on brackets 17 mounted for relative horizontal adjustment along horizontal frame rails 18 to accommodate rollers of different lengths and having V-shaped bearing sockets 19 at their upper ends to receive opposite ends of the roller shaft 11. To rotate the roller at a predetermined peripheral speed regardless of what its outside diameter may be, rotary power from an electric motor 20 is applied frictionally to the surface of the coating 12. To this end, the motor shaft operates through the medium of a belt 21 and suitable speed reduction gearing within a box 22 to drive a shaft 23 carrying a sprocket wheel 24 which is connected by an endless chain 25 to a sprocket wheel 26 on a shaft 27 which carries a drive wheel 28. The shaft 27 is journaled in the bifurcated end of an arm 29 which projects above the roller to be sectioned and is pivotally supported at its opposite end on the shaft 23. The wheel 28 bears downwardly under its own weight and that of the arm 29 against the peripheral surface of the roller coating thereby providing the friction necessary to rotate the roller at a slow speed during operation of the motor. Preferably, the drive mechanism is constructed to rotate the roller at a peripheral speed of approximately fourteen inches per minute although the maximum permissible speed will vary somewhat with various factors as will appear later.

The heat for melting localized areas of the composition 12 as the roller is rotated is applied and diversion of the melted composition effected by a tool 30 heated to a temperature substantially above the melting point of the composition and having a straight end edge 31 which, during the grooving operation, is disposed parallel to the roller axis and closely adjacent but out of contact with the outer periphery of the rubber base 10 as shown in Fig. 6. Herein the tool comprises a plate of metal detachably secured against the inclined end of a hollow bar 32 by screws 33ª entered through slots 34ª in the tool plate. Within the bar is disposed an electric heating element 34 suitably electrically insulated from the metal parts and supplied with current through conductors extending from a junction box 35ª. An adjustable thermostatic switch 36ª (Fig. 5) secured to one side of the bar 32 and interposed in series with the heating element and the source of current therefor operates in response to temperature changes of the bar to regulate the current flow to the element in a well known manner and thereby maintain the bar 32 and therefore the tool 30 at a substantially uniform temperature.

To enable the permissible speed of rotation of the roller to be increased to a maximum, the tool is preferably maintained at a temperature which is as high as possible without causing injury to the finished roller. A temperature of 325 to 350 degrees Fahrenheit has been found satisfactory with a composition which will flow freely when heated to 150 degrees.

To provide for natural drainage of the melted composition off from the roll, the tool 30 is, in the present instance, mounted beneath the roll with its face 37 inclined away from the edge 31 in the direction of rotation of the roll as shown in Fig. 6. The tool is mounted for vertical movement into and out of operative position and also for movement along the roller. For this purpose, the bar 32 is secured to a block 33 of insulation which in turn is bolted to a lever 34ᵇ mounted on a pivot pin 35 on the upper end of a bracket arm 36 upstanding and inclined rearwardly from a slide 38 which rests on the rails 18 and is slidably clamped thereto by a plate 39 (Fig. 6). By tightening a thumb screw 40 threading through the slide 38, the latter may be secured in any desired position along the rails.

Preferably the tool is constantly urged upwardly toward operating position adjacent the roller this being accomplished herein by a weight 41 on the rearwardly projecting end of the lever 34ᵇ. To limit this movement and locate the active edge 31 of the tool in an accurately defined but nevertheless adjustable position with respect to the surface of the base roller 10, a follower is provided which bears against the coating surface adjacent the tool and is rigidly connected to the lever 34ᵇ so that the depth to which the edge 31 enters the composition is measured with respect to the coating surface. Herein, the follower comprises a roller 42 rotatably mounted on the free forward end of an arm 43 fulcrumed intermediate its ends on a pivot 44 carried by the lever 34ᵇ and having at its rear end a lug 45 which engages the end of an adjusting thumb screw 46 threading through the lever. The arm 43 is thus adapted for angular adjustment relative to the lever 34ᵇ so that by turning the screw 46, the periphery of the follower roller relative to the tool edge 31 may be varied as desired and the depth of the groove which is formed varied accordingly. A spring pressed detent 47 (Fig. 6) engaging in serrations on the head of the screw 46 serves to lock the screw in adjusted position.

To avoid the necessity of extreme accuracy in manufacture and mounting of the follower roller 42 and its supporting parts, the roller is mounted for a limited degree of longitudinal rocking motion. This is accomplished in the present instance by supporting the roller through the medium of an anti-friction bearing 48 (Fig. 8) which has an inner raceway carried by a bushing 49 loose on and pivotally connected by a cross-pin 50 to the reduced end of a rod 51 rigid with and projecting laterally from the arm 43. The roller may thus tilt about the axis defined by the pin 50 and adapt itself to the surface of the coating 12.

With the arrangement above described, it will be observed that individual setting of the tool preparatory to forming each groove is unnecessary even though the successive rollers being grooved may vary in size. This is because the depth to which the tool edge may enter the composition is determined with reference to the coating surface, so that once the proper relation between the edge 31 and the periphery of the follower roller 42 has been established by adjustment of the thumb screw 46, any number of grooves of equal depths may be formed simply by shifting the supporting slide 38 to the desired position along the rails 18 and allowing the tool and follower to move up against the roller under the action of the weight. To hold the tool in inactive position away from the roller while the latter is being mounted in the machine and during setting of the tool, a latch 52 is pivoted at 53 on the frame 36 adjacent the fulcrum thereof so that a shoulder 54 thereon will drop in behind a shoulder 55 on the lever 34ᵇ when the tool is lowered away from the roller as shown in Fig. 5.

Any number of the tool units above described may be mounted on the rails 18 and the machine thus adapted for forming several of the grooves simultaneously as illustrated in Fig. 1. In this manner, the production capacity of the machine may be increased as desired.

In order to remove the small amount of composition which is required in order to form a groove and at the same time avoid enlarging the portions of the ink-carrying sections 14 adjacent the groove, the tool 30 is of special shape. Preferably, it is formed with the straight end edge 31 of narrow width as shown in Fig. 4 and short side edges 56 of similar width merging with the edge 31 at rounded corners 57. Notches are formed in the back of the tool head to define side surfaces 58 converging from the edges 56. An inclined end surface 59 merges with the edge 31 and slopes away from the point of contact between the edge and the coating composition.

The tool is thus adapted for rapid conduction of heat to its active edges 31 and 56. In view of the narrow character of the edges and the thinness of the film of composition to be removed, it will be observed that heat in quantities sufficient to melt the composition and heat the same to a free flowing condition will be applied only to that part of the composition immediately adjacent the edges 31 and 56. Thus, by properly correlating the temperature of the tool and the speed of rotation of the roller, only the desired amount of the composition will be melted and diverted off from the roller. By inclining the surfaces 58 and 59 away from the active tool edges, heating of the portions of the composition trailing behind said edges to a melting temperature is avoided and the danger of melted composition accumulating at the bottom of the groove or being forced outwardly over the edges of the groove onto the adjacent inking surfaces is eliminated.

Confining of the melting action of the tool to those portions of the composition immediately adjacent the tool edges so as to form an accurately shaped groove with a smooth uninterrupted defining surface is attributable not only to the manner in which the heat is applied but also to the fact that the rubber of which the base roller is composed is a poor conductor of heat, and the further fact that the glue-glycerine mixture constituting the printers' composition has no definite melting point but softens gradually upon heating. As a result, only that portion of the composition immediately adjacent the tool edges 31 and 56 is rendered fluid during the time it is exposed to the action of the tool. In view of this high degree of heat localization, substantially all of the composition which is melted and actually heated to a free flowing state will be scraped or diverted off from the roller and drain downwardly. Some of the composition not so removed will be softened to some extent but this will congeal immediately upon passing the tool edges thereby leaving continuous smooth surfaces defining the groove which may be rounded slightly at its edges as shown in Fig. 3.

The melted composition which is removed from the roller flows down along the inclined forward face of the tool and is maintained thereby in a fluid state. The upper surface of the slide 38 is dished to provide a receptacle for receiving the composition draining from the tool as shown in Fig. 6.

By gauging the depth of the groove with reference to the peripheral surface of the coating 12, complete covering of the rubber surface at the root of the groove by the thin film 12ᵃ of composition is insured in spite of variations which are likely to occur in service operation. Thus any lack of concentricity of the inking surface with reference to the ends of the shaft 11, variations in temperature of the heated tool, and the like are compensated for automatically by shifting of the active edge 31 of the tool through the medium of the follower roller 42.

In operation, the coated roller to be grooved is mounted in the machine while the tools are latched in their retracted positions, and the drive wheel 28 is then lowered against the composition surface near one end thereof to cause rotation of the roller. With each tool heated to its operating temperature, the latch 52 is released and the tool allowed to move upwardly against the rotating roller whereupon the tool edge 31 will immediately begin to melt the composition and enter the composition until the follower 42 engages the surface of the coating 12. In the continued rotation of the roller, the composition immediately adjacent the active edges of the tool is melted and rendered sufficiently fluid to be removed by the tool to a depth determined by the setting of the follower roll relative to the tool edge 31. The final setting may, if desired, be made after the beginning of the grooving operation and preferably is such that the film 12ᵃ of composition approximately .005 of an inch in thickness is left at the bottom of the groove. With a composition which will flow readily at approximately 150 degrees F. and with the tool heated to about 325 degrees F. and the roller rotated at a peripheral speed of about 14 inches per minute, the groove ordinarily will be completed in a single revolution of the roller. Where harder composition is used which cannot be melted to the required depth under the above conditions, two revolutions may be required for completion of the groove. Or if desired, the peripheral speed may be decreased in order to complete the groove in one revolution.

In some instances, it may be desirable to form several somewhat narrower and closely spaced grooves in the roller coating. This may be accomplished by substitution of a tool of the character shown in Fig. 7 having a plurality of straight edges 31 spaced apart according to the desired spacing of the grooves to be formed.

I claim as my invention:

1. A machine for forming an annular groove in the composition surface of an inking roll having, in combination, means rotatably supporting said roll, a tool having an edge corresponding in length to the width of the groove to be formed and tending to move edgewise toward the axis of said roll, means for maintaining said edge heated to a temperature at which said composition will flow, and a follower movable with said edge and engageable with the peripheral surface of said composition and acting during rotation of the roll to determine the depth to which said edge may enter said composition.

2. A machine for forming an annular groove in the composition surface of an inking roll comprising a base cylinder composed of rubber or like material and covered with a film of congealed printers' composition or the like, said machine having, in combination, a tool, means for supporting said roll and said tool for relative rotation, an edge on said tool corresponding in length approximately to the width of the groove to be formed and tending to move edgewise toward the axis of said cylinder, means for maintaining said edge heated to a temperature at which said composition will flow, and a follower movable with said edge and engageable with the peripheral surface of said composition adjacent said edge and acting during said rotation to permit entry of the edge into said composition to a predetermined depth spaced from the periphery of said cylinder.

3. A machine for forming an annular groove in the composition surface of an inking roll having, in combination, means for rotatably supporting said roll, a tool edge corresponding in length to the width of the groove to be formed and tending to move toward the axis of said roll, means for maintaining said edge heated to a temperature at which said composition will flow, and a follower roller movable with said edge and engageable with the peripheral surface of said composition and acting during rotation of the roll to determine the depth to which said edge may enter the composition, said roller being mounted for longitudinal tilting movement.

4. A machine for sectioning a composition coated inking roll having, in combination, a tool having a substantially flat face terminating in substantially straight end and side edges, side surfaces merging with said side edges and converging away from said face, and an end surface merging with said edge and making an acute angle with said face, means supporting said tool for entry of said edges into the periphery of said roll, means supporting said roll and rotating the same in a direction to move peripheral portions thereof toward said face, and means for maintaining said edges at a temperature substantially above that at which said composition will melt and flow freely.

5. A machine for forming an annular groove in the printers' composition on the surface of an inking roll having, in combination, means rotatably supporting said roll, a tool having an edge corresponding in length to the width of the groove to be formed and mounted for edgewise movement toward the axis of the roll, means for maintaining said edge heated to a temperature at which said composition will melt and flow freely, and means for gauging the depth to which said heated edge may enter the surface composition including a member engageable with the peripheral surface of the roll and acting when engaging the latter to establish a predetermined positional relation between said edge and said surface.

6. A machine for grooving printers' inking rollers by liquefaction of the surface composition of the roller, comprising in combination, a grooving tool having a blunt non-cutting edge maintained at a temperature much higher than the temperature at which said surface composition will be converted into a free flowing fluid, means for maintaining said tool at such temperature, means for causing relative rotation at a slow rate between said tool and the roller, means for supporting said tool for free movement toward and away from said roller and for constantly urging said tool into working engagement with the roller surface, thereby causing said tool to melt its way into said surface and around said surface to form an annular groove, and causing the melted composition to flow off from said tool in a fluid stream, a gauge bearing upon the ungrooved peripheral surface of the roller adjacent to said tool, and means for supporting said gauge to move with said tool and for maintaining a fixed spaced relation therebetween, with the blunt operative end of said tool projecting beyond the roll-engaging portion of said gauge, whereby the depth of the groove will be controlled by said gauge.

7. A machine for grooving printers' inking rollers of the character having a base cylinder covered with a thin surface coating of a meltable composition, groove-forming means operating solely by liquefaction of said composition and comprising a tool having a blunt non-cutting edge maintained at a temperature much higher than the temperature at which said surface composition will be converted into a free flowing fluid, means for maintaining said tool at such temperature, means for causing relative rotation between said tool and the roller, means for supporting said tool to move freely toward and from the roller and for constantly urging the blunt edge of the tool into working engagement with the roller surface thereby causing said tool to melt its way into said surface coating composition and form a groove therein during the relative rotation of the tool and roller, the tool causing the melted composition to flow off from said roller in a fluid stream, and means including a follower bearing upon the ungrooved surface of the roller and acting to limit the depth of entry of the tool into the roller surface to a distance less than the thickness of the surface coating composition thereon, thereby leaving a protecting coating of such composition about the base cylinder at the bottom of the groove.

HARRY E. LAMBERT.